Oct. 20, 1931.  J. J. PITTS  1,827,906
EXTENSION WINDSHIELD WIPER
Filed May 9, 1929
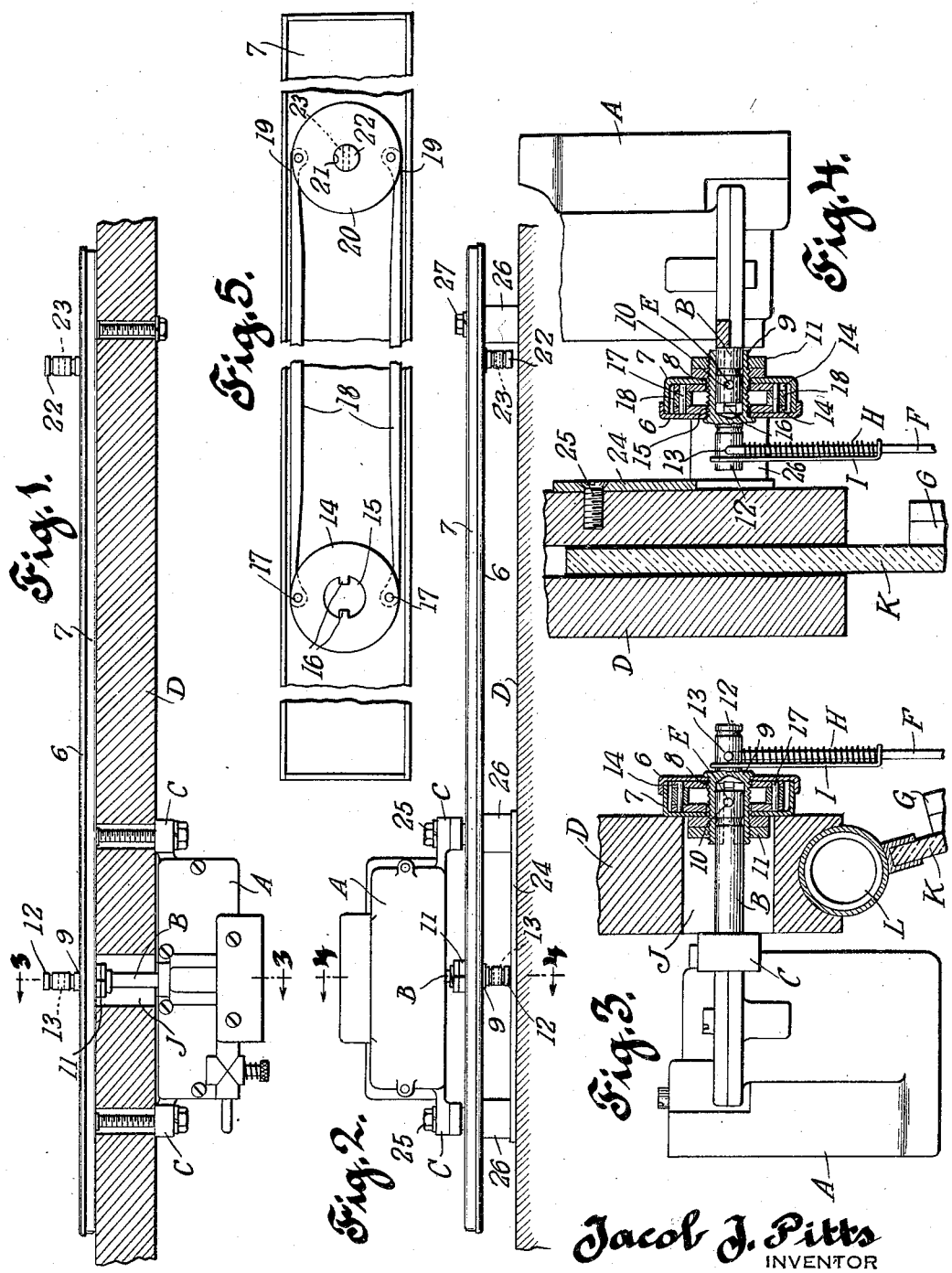
Jacob J. Pitts
INVENTOR
BY C. Cousins
ATTORNEY Patented Oct. 20, 1931

1,827,906

UNITED STATES PATENT OFFICE

JACOB J. PITTS, OF NEW YORK, N. Y.

EXTENSION WINDSHIELD WIPER

Application filed May 9, 1929. Serial No. 361,825.

This invention relates to extension windshield wipers.

Experience with automobiles has shown that it is desirable and even necessary to keep a large portion of the windshield clean so that the vision of the driver will not be impeded by rain or snow collecting on the windshield. The usual means for effecting this result is to provide an extension from the main wiper and pivot a second wiper on the windshield at a point removed from the first wiper. This has been found to be unsatisfactory because it is necessary to drill a hole in the windshield frame to pivot the second wiper. Unless the second wiper is in absolute alignment with the first wiper they will bind and become inoperative. Further, after being exposed to the elements for a comparatively short time the extension arm and the second wiper become hard to operate and the ordinary wiping unit provided as standard equipment on automobiles is not strong enough to operate the wiper.

Therefore, one object of the invention is to provide an extension for a windshield wiper which will not bind and which will not necessitate putting a second pivot in the windshield frame.

Another object of the invention is to provide an extension windshield wiper which is entirely enclosed in a casing so that it will not be affected by the elements.

A further object of the invention is to provide an extension windshield wiper which will be so easy of operation that the ordinary vacuum wiping mechanism will be strong enough to operate both wipers.

In the manufacture of motor cars the windshields provided are usually of one of two types. In the ordinary type the windshield is pivoted at the top and opened by swinging the windshield forward on its pivot. When this type is used the actuating unit is placed inside of the car and the operating shaft extends through an opening in the frame. In the other common type of windshield, known as the "V V" type, the glass is set in a frame and opened by sliding the glass upward in a vertical plane. It is therefore necessary to put all of the mechanism outside of the car so that the space above the glass may be left clear in order to raise the windshield.

Therefore, another object of the invention is to provide a wiper adapted to be used with either of the common types of windshields.

In the manufacture of motor cars when a windshield wiper is included as standard equipment, it is usually a single wiper. Therefore, another object of the invention is to provide a device which may be used with the wiper which is provided without great expense or the necessity of scrapping the wiper which is sold with the car.

A further object of the invention is to provide a device wherein all of the parts except the squeegees will be above the windshield and out of the line of vision of the driver.

A further object of the invention is to provide a device which will be inexpensive and of simple construction so that it may be applied to any car easily and quickly without the need of skill or unusual tools.

A further, more specific object of the invention is to provide a construction wherein the working parts are balanced so that the operation will be smooth and even instead of eccentric.

The invention consists of the construction, combination and arrangement of parts as herein illustrated, described and claimed.

In the accompanying drawings forming part hereof is illustrated one form of embodiment of the invention showing the application thereof to the two common types of windshield, in which drawings similar reference characters designate corresponding parts and in which the parts old in the art are lettered and the parts constituting the invention are numbered, and in which:

Figure 1 is a plan view, partly broken away, showing the application of the invention to the ordinary type of windshield;

Figure 2 is a plan view showing the application of the invention to the "V V" type of windshield;

Figure 3 is a vertical section taken approximately on line 3—3 of Figure 1, looking in the direction indicated by the arrows;

Figure 4 is a vertical section taken approximately on line 4—4 of Figure 2, looking in the direction indicated by the arrows; and, Figure 5 is a fragmentary detail in elevation showing the interior construction of the extension.

Referring ot the drawings and particularly to Figures 1 and 3, A designates a common form of wiper unit having a rockable shaft B. The unit A is provided with ears C through which suitable bolts 25 pass to secure the unit A to the frame D of the windshield. The same bolts 25 may also be used to hold the housing hereinafter referred to. The shaft B passes through an opening J in the frame D to the outside of the car. The end of the shaft B is provided with a hole E which is ordinarily adapted to receive the bent end of the actuating arm F of a squeegee G. The actuating arm F is provided with a spring H and a restraining member I in order to hold the squeegee G under tension against the windshield glass K in any position to which the glass K may be rocked on its tube and collar pivot L.

Disposed horizontally on the outside of the frame D is an elongated flanged member 6 which coacts with a complementary flanged member 7 to form a complete housing for the extension hereinafter described. The members 6 and 7 are provided with openings 8 in alignment with the shaft B.

Disposed through the openings 8 is a hollow, split shaft 9 adapted to receive the end of the shaft B. The shaft 9 is exteriorly screwthreaded and a nut 11 is used to hold the shaft 9 firmly in place. In the hole E of the shaft B which ordinarily carries the arm of a squeegee is disposed a pin 10. The pin 10 projects from either side of the shaft B and engages in the slots in the shaft 9 so that when the shaft B is rocked the shaft 9 will also be rocked. One end 12 of the shaft 9 is provided with a hole 13 corresponding to the hole E in the shaft B so that the actuating arm F of a squeegee G may be carried on the shaft 9. The shaft 9 forms a simple adapter to permit easy assemblage of the parts on a windshield frame.

Inside of the housing formed by the members 6 and 7 is a pair of circular plates 14 in alignment with the openings 8 and the shaft 9. The plates 14 are provided in their centers with openings 15 through which the shaft 9 passes. Two pairs of lugs 16 project inwardly from the walls of the openings 15 and are adapted to engage the slots in the shaft 9 so that when the shaft 9 is rocked by the movement of the shaft B the plates 14 will also be rocked.

Between the plates 14 and near their outer edges are pivoted the ends 17 of a pair of complementary reciprocating rods 18. The rods 18 extend to a point near the opposite end of the housing formed by the members 6 and 7 where their opposite ends 19 are pivoted between a pair of plates 20 which are similar to the plates 14. The plates 20 are provided in their centers with openings 21 into which is set a stud 22. The stud 22 is rockably seated in the openings 21 so that when the plates 20 are rocked by the movement of the rods 18 the stud 22 will also be rocked. The stud 22 extends through and projects past the member 7 the same distance that the shaft 9 extends past the member 7 and is provided with a hole 23 adapted to receive the bent arm F of a squeegee G in like manner as the hole 13 in the shaft 9.

With this construction a minimum of power is necessary to transmit the oscillation of the shaft B to the stud 22. It will also be apparent that the extension will not bind even if the stud 22 is not in horizontal alignment with the shaft 9 so that precision is not necessary in applying this device to a motor car.

Referring more particularly to Figures 2 and 4, these figures illustrate the application of the invention to the "V V" type of windshield. It is necessary to have all of the mechanism outside of the car so that the glass K may be raised without obstruction.

To effect this result a U shaped bracket 24 is disposed on the outside of the frame D above the glass K. The bracket 24 may be held by suitable studs or bolts 25 which also pass through the ears C of the wiping unit A and the housing formed by the members 6 and 7. Between the bracket 24 and the member 6 spacers 26 are inserted in order to hold the members 6 and 7 far enough from the frame D to allow space for operation of the shaft 9. It will be noted that the shaft B is shorter in this wiping unit than the shaft B used in the unit for application inside of the car. They are manufactured thusly because it is not necessary to have the shaft B as long if it does not have to extend through the frame D. In other respects the wiping units A are identical.

One or more spacers 26 are used adjacent the stud 22 in order to hold the members 6 and 7 equidistant at all points from the frame D. A stud 27 may be used to hold the members 6 and 7 and the spacer 26 firmly to the frame D.

With this construction all of the mechanism is on the outside of the frame D and the glass K is free to move upward. A pair of squeegees G are affixed to the shaft 9 and the stud 22 in the same manner as heretofore described.

Having thus fully described the invention, what is claimed as new and desired to be secured by Letters Patent is:

A windshield wiper comprising the combination of an actuating element and a shaft adapted to be rocked by the actuating element and provided with an opening therein, a pin disposed in the opening, a slotted extension disposed over the shaft and arranged to be engaged by the pin, a squeegee carried by the extension and a second squeegee disposed at a point remote from the extension and means operated by the extension for operating the second squeegee.

In testimony whereof he affixes his signature.

JACOB J. PITTS.